United States Patent [19]

Kanazawa

[11] Patent Number: 4,926,320

[45] Date of Patent: May 15, 1990

[54] INFORMATION PROCESSING SYSTEM HAVING MICROPROGRAM-CONTROLLED TYPE ARITHMETIC PROCESSING UNIT

[75] Inventor: Takashi Kanazawa, Tokyo, Japan

[73] Assignee: NEC Corporation, Tokyo, Japan

[21] Appl. No.: 178,241

[22] Filed: Apr. 6, 1988

[30] Foreign Application Priority Data

Apr. 7, 1987 [JP] Japan .................................. 62-83720

[51] Int. Cl.⁵ ..................... G06F 13/14; G06F 15/16
[52] U.S. Cl. .................................. 364/200; 364/258; 364/228.6; 364/271.2
[58] Field of Search ......................... 364/900 MS File

[56] References Cited

U.S. PATENT DOCUMENTS

| | | | |
|---|---|---|---|
| 4,424,581 | 1/1984 | Kawai | 365/154 |
| 4,443,849 | 4/1984 | Ohwada | 364/200 |
| 4,524,415 | 6/1985 | Mills, Jr. et al. | 364/200 |
| 4,542,456 | 9/1985 | Hill | 364/200 |

OTHER PUBLICATIONS

IBM Technical Disclosure Bulletin, vol. 21, No. 7, Dec. 1978, pp. 2765-2767, "Dynamic Hardware Sampling of On-Line Processing", by Cardenia et al.

Primary Examiner—Lawrence E. Anderson
Attorney, Agent, or Firm—Foley & Lardner, Schwartz, Jeffery, Schwaab, Mack, Blumenthal & Evans

[57] ABSTRACT

An information processing system comprises at least one arithmetic processing unit operating under the control of a microprogram and a system control unit which exchanges information with the arithmetic processing unit. The system control unit is not required to perform distinction processing between one source of interruption, for example a fault notice, and another source of interruption, for example a clock synchronization demand.

5 Claims, 4 Drawing Sheets

INFORMATION PROCESSING SYSTEM HAVING MICROPROGRAM-CONTROLLED TYPE ARITHMETIC PROCESSING UNIT

BACKGROUND OF THE INVENTION

The present invention relates to an information processing system wherein at least one microprogram-controlled type arithmetic processing unit freezes the internal state of the unit by a microprogram and notifies another unit of a demand for communication by the microprogram.

In an information processing system including a plurality of arithmetic processing units, if a fault occurs in one of the arithmetic processing units, a fault report signal is given to the system control unit, which then remedies the fault by the use of a processor relieving technique. For details of this technique, reference may be made to the U.S. Pat. No. 4,443,849.

Meanwhile, if the firmware of one of the arithmetic processing units requires clock synchronization with the timers of all the other processing units, the communication demand from the firmware will also be given to the system control unit as the aforementioned fault report signal. Therefore, in response to the fault report signal, the system control unit has to process distinction as to whether or not to remedy the fault. As a result, there is the disadvantage that the system control unit has to execute very complex processing and spend much time for this fault remedying.

SUMMARY OF THE INVENTION

An object of the present invention is to provide an information processing system free from the above-mentioned disadvantage.

In a system according to one aspect of the invention, there is provided an information processing system which comprises at least one arithmetic processing unit operating under the control of a microprogram; and a system control unit which exchanges information with this arithmetic processing unit, wherein:

said arithmetic processing unit comprises communication information holding means responsive to a demand by the microprogram for holding information to be communicated to said system control unit;

updating suppressing means, responsive to storing of communication information in the communication information holding means, for suppressing the updating of internal state information stored in said arithmetic processing unit;

communication demand means, responsive to storing of communication information in said communication information holding means, for outputting a communication demand to said system control unit;

communication cancelling means responsive to an instruction from the system control unit, after processing by the system control unit in response to the communication demand from the communication means, for clearing the communication information held in said communication information holding means, cancelling the communication demand from said communication demand means, lifting the updating suppression by said updating suppressing means, and thereby bringing the operation of the microprogram into a state of standing by for reactuation; and microprogram actuating means for reactuating the operation of the microprogram in the state of waiting by for reactuation, in accordance with an instruction from said system control unit.

BRIEF DESCRIPTION OF THE DRAWINGS

Other objects, features and advantages of the present invention will be made more apparent from the detailed description hereunder when taken in conjunction with the accompanying drawings, wherein:

In FIGS. 1 to 4, the same reference numerals represent the same structural elements, respectively.

DETAILED DESCRIPTION OF THE PREFERRED EMBODIMENTS

Figure 1:
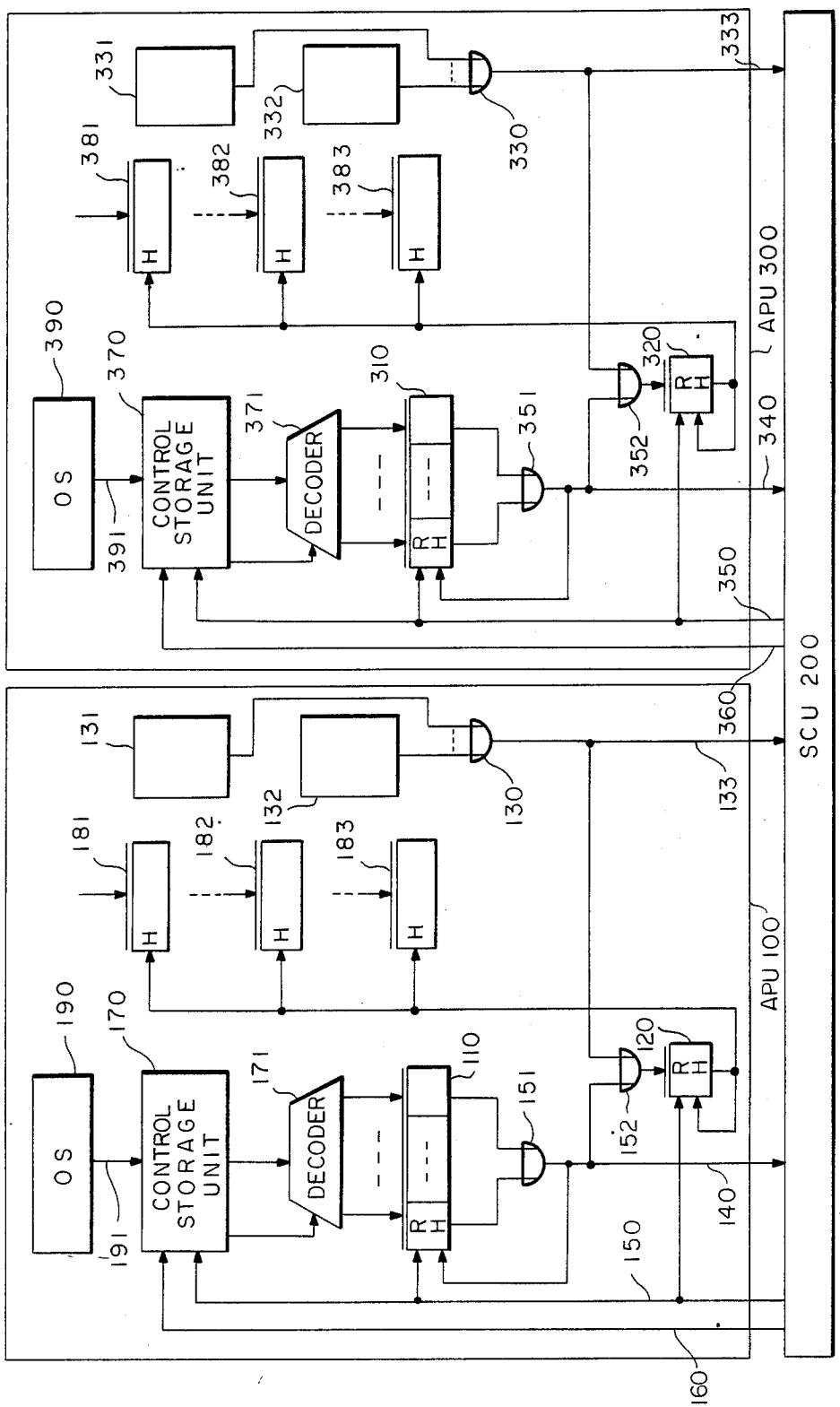
FIG. 1 illustrates a first preferred embodiment of the invention.

Referring to FIG. 1, a system to which the present invention is applicable comprises a plurality of arithmetic processing units 100 and 300, and a system control unit 200 connected to these arithmetic processing units 100 and 300.

The essential part of a first embodiment of the invention is realized with the arithmetic processing units 100 and 300. As the arithmetic processing unit 300 is the same as the arithmetic processing unit 100 in structure, only the arithmetic processing unit 100 will be described below.

The arithmetic processing unit 100 comprises a control storage unit 170 for storing a microprogram and reading out microinstructions; a decoder 171 for decoding the microinstructions from the unit 170; communication information holding means 110, which may be a register for example, responsive to a signal supplied to its H terminal for holding communication information decoded by the decoder 171 and responsive to a signal supplied to its R terminal for resetting itself; an OR circuit 151 for obtaining the logical sum of the communication information held by the holding means 110; communication demand means 140 for transmitting a signal from the OR circuit 151, as the communication demand signal, to the system control unit 200 through a line; a plurality of fault detecting circuits 131 to 132 for detecting faults in the arithmetic processing unit 100; an OR circuit 130 for obtaining the logical sum of fault detection signals from the fault detecting circuits 131 to 132; fault reporting means 133 for transmitting the output of the OR circuit 130 to the system control unit 200 through a line; a group of registers 181, 182 and 183 for storing the internal state of the arithmetic processing unit 100; an OR circuit 152 for obtaining the logical sum of the output of the OR circuit 151 and that of the OR circuit 130; updating suppressing means 120, which may be a flip flop for instance, responsive to the signal inputting to its H terminal for holding the output of the OR circuit 152, and responsive to the signal inputting to its R terminal for resetting itself, and which suppresses updating by supplying signals, outputted during the holding, to the H terminals of the group of registers 181, 182 and 183; communication cancelling means 150 for cancelling a communicating state by supplying signals to the R terminal of the communication information holding means 110 and that of the updating suppressing means 120; microprogram actuating means 160 for actuating the microprogram by supplying an instruction from the system control unit 200 to the control storage unit 170 via a line; and an operating system (OS) 190 for controlling the operation of the arithmetic processing unit 100.

The first preferred embodiment of the present invention presupposes, in the event that a fault is detected in the arithmetic processing unit 300, communication processing to have the arithmetic processing unit retry the command after the normally operating arithmetic processing unit 100 has accomplished processor relief. For details of processor relief, reference may be made to the U.S. Pat. No. 4,443,849.

Next will be described in detail the operation of the first preferred embodiment of the invention with reference to accompanying drawings.

Figure 2:
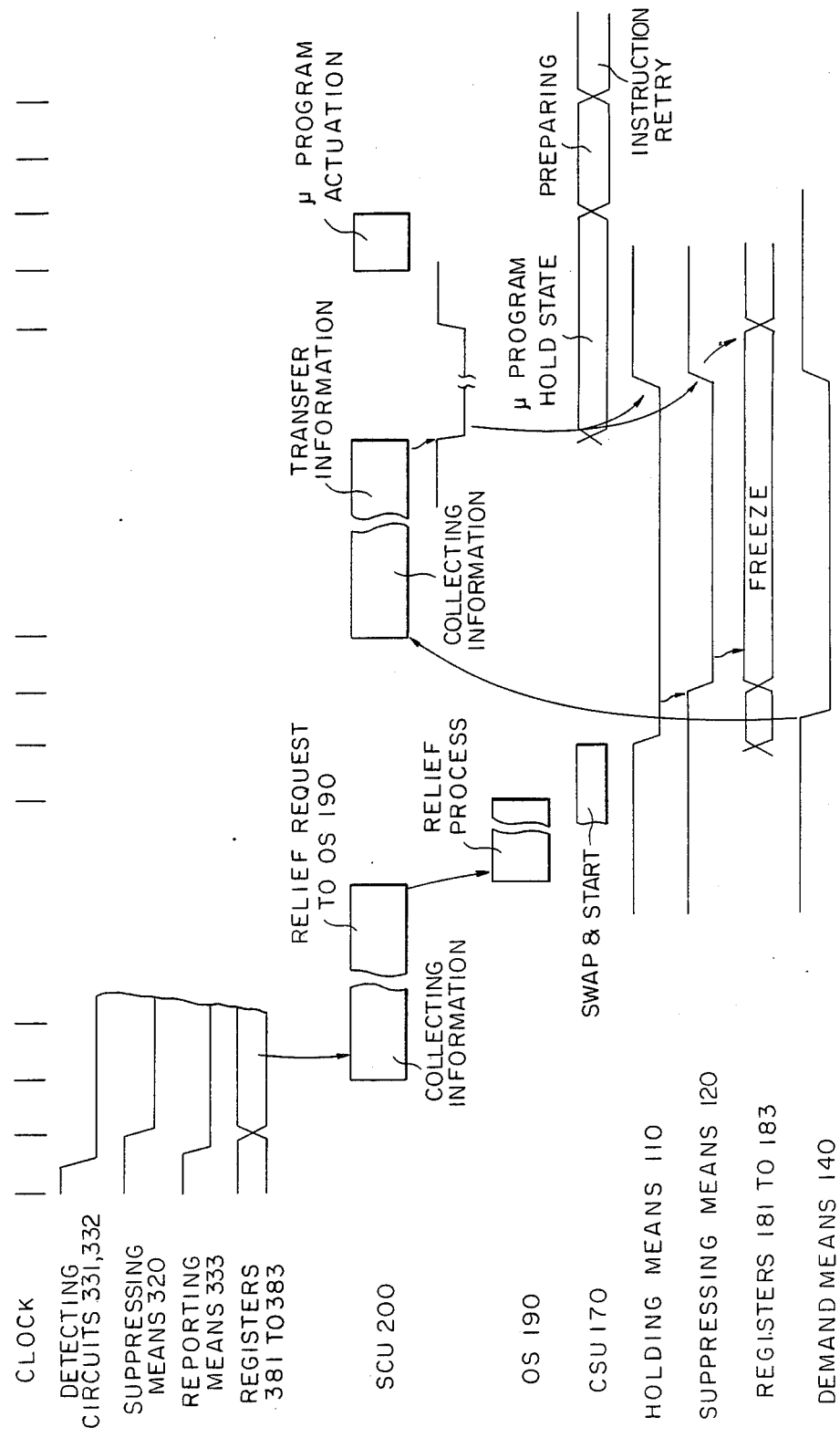
FIG. 2 is a time chart showing the operation of the first embodiment of the invention.

Referring to FIGS. 1 and 2, either of fault detecting circuits 331 and 332 of the arithmetic processing unit 300 detects a fault within the arithmetic processing unit 300, and notifies the system control unit 200 of the fault by means of fault reporting means 333 through an OR circuit 330. Along with this fault reporting, the system control unit 200 stores information, including what concerns the internal state of the unit 300, in storage means (not shown) in the system control unit 200.

Then, the unit 200, responding to storing of information from the unit 300, gives a processor relief instruction to the OS 190 of the arithmetic processing unit 100. In response to this instruction, the OS 190 of the unit 100 actuates the control storage unit 170 via a line 191. In response to this actuation, a micro-instruction read out of the control storage unit 170 is decoded by the decoder 171. The result of decoding by the decoder 171 is supplied to the communication information holding means 110 as communication information. The output of the holding means 110 is supplied to the H terminal of the holding means 110 through the OR circuit 151, and the communication information holding means 110 holds the communication information supplied from the decoder 171. If even a single bit of logical "1" is present in this held information, the logical value "1" of the bit is supplied to the updating suppressing means 120 via the OR circuits 151 and 152. The output of this means 120 is supplied to its H terminal, and the suppressing means 120 holds the logical "1" provided to it. The held signal is continually supplied to the H terminals of the group of registers 181, 182 and 183. As long as this signal is supplied to them, the group of registers 181, 182 and 183 suppress the updating of the stored information.

The normal operation, other than updating done by utilizing a scan path for the registers 181, 182 and 183, is suppressed so as to freeze the contents of the arithmetic processing unit 100.

In a parallel operation with this operation, the output of the OR circuit 151 is supplied to the system control unit 200 through communication demand means 140.

As a result, the unit 200 need not perform distinction processing between one source means of the interruption signal and another source means of the interruption signal, so that the unit 200 is free from the overhead required for this distinction processing.

In response to the interruption signal through the communication demand means 140, the system control unit 200 reads the contents of the registers 181, 182 and 183 and stores said contents into the other storage means (not shown), i.e., other than the storage means (not shown) provided at the unit 200 for storing information which concerns the internal state of the unit 300.

For details of this scan path function, reference may be made to the U.S. Pat. No. 4,424,581.

The system control unit 200 then transfers the information concerning the internal state of the unit 300, from the above-mentioned storage means (not shown) provided in the unit 200 to the registers 181, 182 and 183 using the above referenced scan path function.

The unit 200 supplies a reset designation signal to the R terminal of the updating suppressing means 120, the R terminal of the communication information holding means 110 and the control storage unit 170, respectively. In response to the reset designation signal, the updating suppressing means 120 lifts the updating suppression. In response to the reset designation signal, the contents of the holding means 110 are initialized. In response to the signal from the communication cancelling means 150, the control storage unit 170 is brought into a waiting state for reading the microprogram stored at the control storage unit 170.

Next, the system control unit 200 actuates said microprogram by the microprogram actuating means 160.

Thus, the actuated microprogram causes the contents of the registers 181 to 183 to be ready for a retry enable state, followed by an instruction retry. In this way, in the first embodiment, even when a fault is detected, interruption into the system control unit 200 is achieved with the communication demand means 140 independently of the fault detection signal. This interruption is not necessarily limited to the occasion of a fault having been detected. As an example of interruption in a non-fault-detected instance, processing for simultaneous synchronization of the calendar clock with every arithmetic processing unit will be described below.

Next will be described in detail the second preferred embodiment of the present invention with reference to FIGS. 3 and 4.

Figure 3:
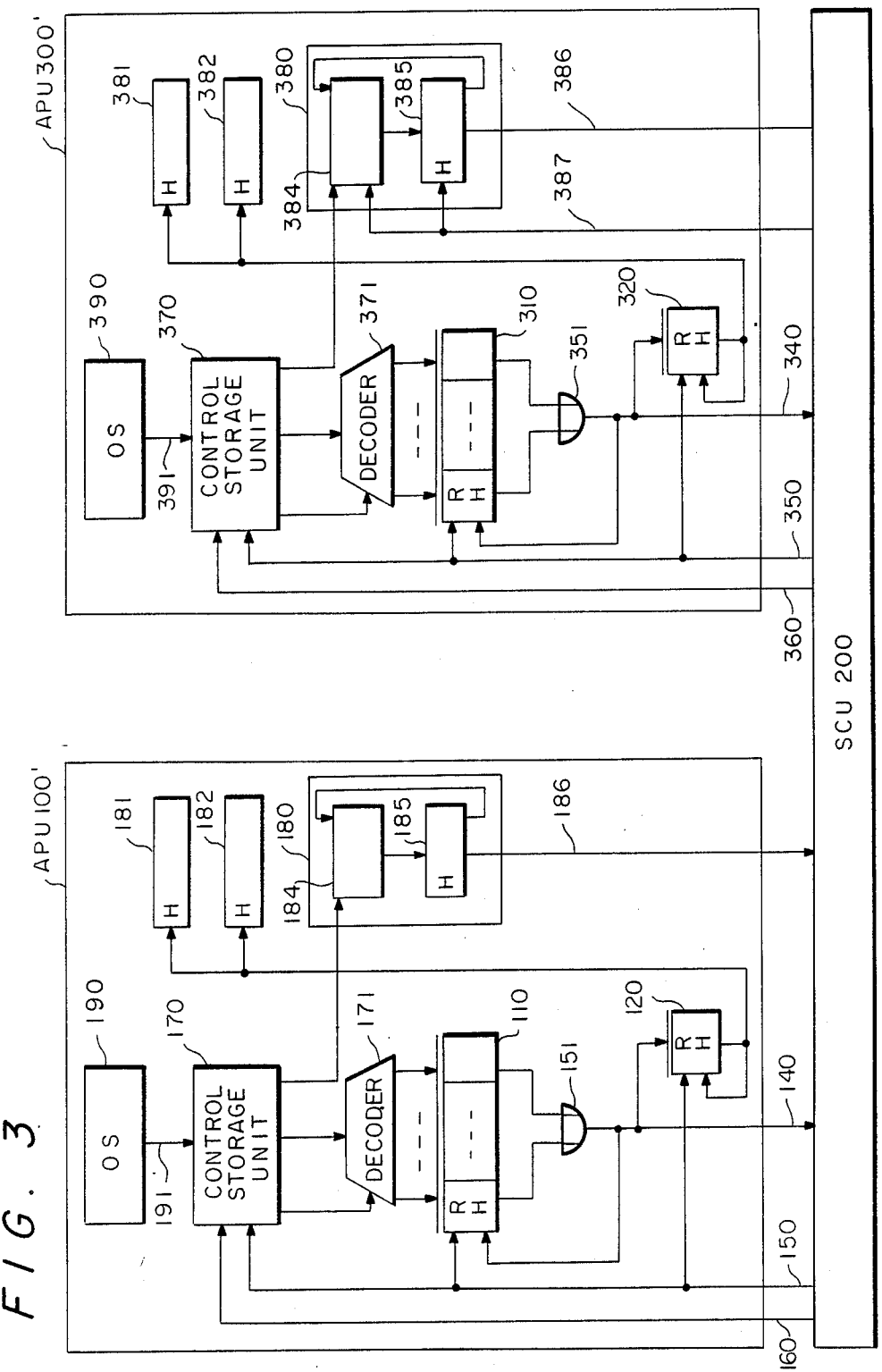
FIG. 3 illustrates a second preferred embodiment of the invention.

Referring to FIG. 3, as arithmetic processing unit 100', which is an essential part of the second preferred embodiment of the invention, is the same as the arithmetic processing unit 300' in structure only the structure of the arithmetic processing unit 100' will be described below.

The processing unit 100' has correspondingly the same structural elements as the arithmetic processing unit 100 of the first embodiment of the invention, including the operating systems (OS) 190, control storage unit 170, OR circuit 151, updating suppressing means 120, communication demand means 140, communication cancelling means 150, microprogram actuating means 160, and group of registers 181 to 182. Besides, these, the arithmetic processing unit 100' is equipped with a calendar clock unit 180 comprising calendar clock updating means 184 and storage means 185 for storing calendar clock values updated by the updating means 184.

The second embodiment of the present invention, structured in this manner, performs processing of calendar clock synchronization.

Next will be described, in detail, the operation of the second embodiment of the invention with reference to FIGS. 3 and 4.

Figure 4:
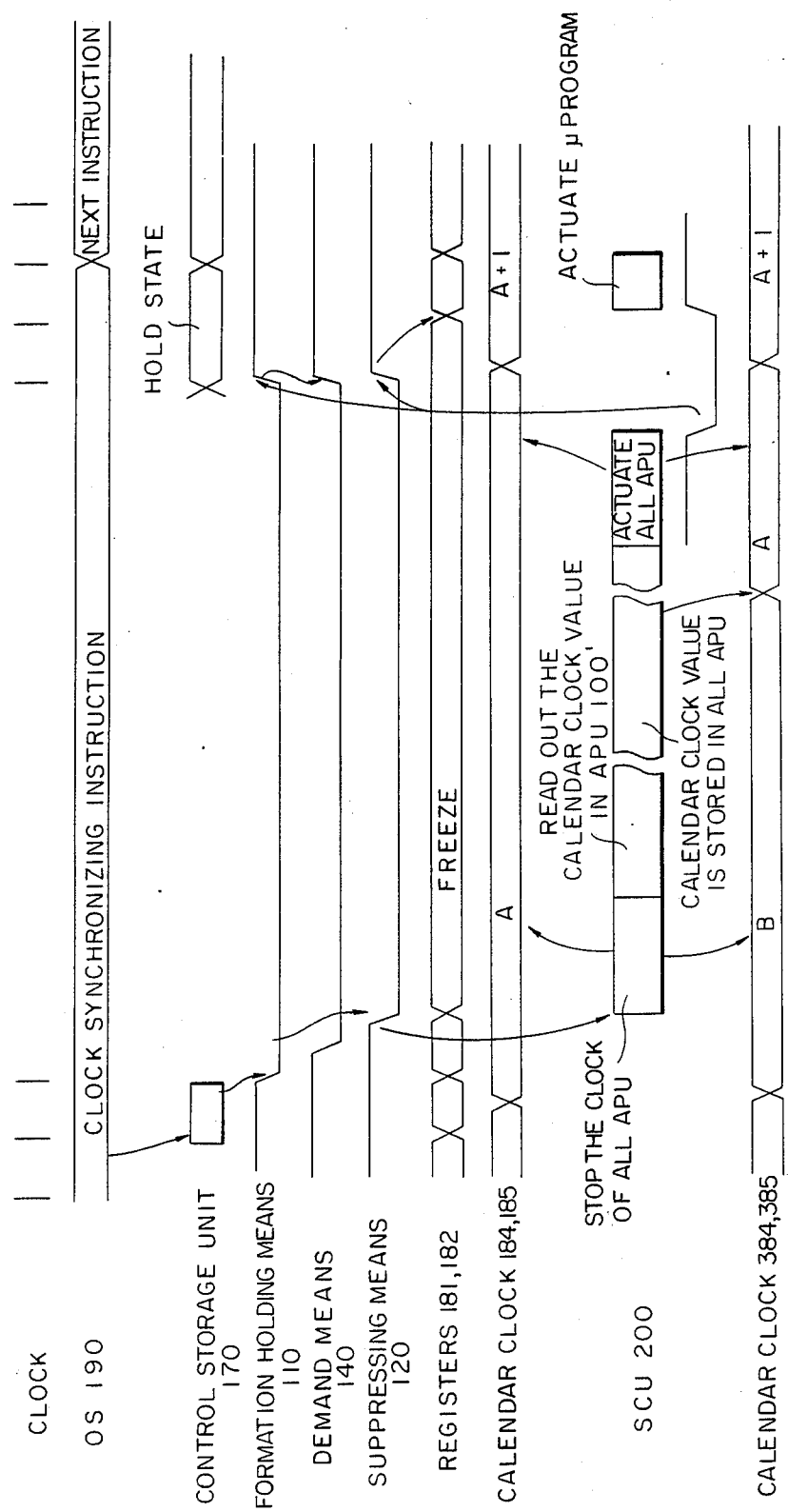
FIG. 4 is a time chart showing the operation of the second embodiment of the invention.

Referring to FIGS. 3 and 4, the OS 190 of the arithmetic processing unit 100' issues a clock synchronizing instruction, which is supplied to the control storage unit 170 via the line 191. The microprogram of this unit 170 is actuated, in response to the clock synchronizing command supplied from the OS 190, to read out a microinstruction. The microinstruction so read out is decoded by the decoder 171. The result of decoding is supplied as communication information to the communication information holding means 110, whose output is provided to its H terminal via the OR circuit 151. The communication information holding means 110 holds the communication information supplied from the decoder 171 in response to a signal input to its H terminal. The output of the OR circuit 151 is provided to the updating suppressing means 120, whose output is supplied to its H terminal. The output of the updating suppressing means 120 is supplied to the H terminals of the registers 181 to 182, which, as a result, also continue to hold their own stored values. Meanwhile, the output of the OR circuit 151 is supplied to the system control unit 200 as a communication demand from the communication demand means 140 through a line.

In response to this communication demand from the communication demand means 140, the system control unit 200, after stopping both arithmetic processing units 100' and 300' from updating the calendar clock updating means 184 and 384, reads out the contents of the calendar clock value storage means 185 of the arithmetic processing unit 100', and takes them in either by the use of the scan path function, also used in the first embodiment, or via a diagnostic path 186.

Then, the system control unit 200 stores the already taken-in contents of the calendar clock value storage means 185 of the arithmetic processing unit 100' in the calendar clock value storage means 385 of the arithmetic processing unit 300', either by the use of the above-mentioned scan path function or via the diagnostic path 386.

After the contents of the calendar clock value storage means 185 of the arithmetic processing unit 100' have been stored in the calendar clock value storage means (385 for instance) of all the other arithmetic processing units (300' for instance) in this manner, the system control unit 200 restarts the updating actions of the calendar clock updating means 184 and 384 of both arithmetic processing units 100' and 300', and gives a defreezing instruction with the communication cancelling means 150.

In response to this instruction, the arithmetic processing unit 100' lifts the freezing. As a result, calendar clock units 180 and 380 of both arithmetic processing units 100' and 300' resume their respective actions.

At this point of time, both arithmetic processing units 100' and 300' perform processing by the use of calendar clocks synchronized in timing.

After that, the system control unit 200 gives a microprogram actuating instruction to both arithmetic processing units 100' and 300' with the microprogram actuating means 160.

Also in the second preferred embodiment of the present invention, the system control unit 200 can receive a communication demand independently of a fault report signal, so that there is no need to process distinction between fault notice and clock synchronization demand. Therefore, the system control unit 200 is dispensed with the overhead for this distinction processing.

What is claimed is:

1. An information processing system provided with at least one arithmetic processing unit and a microprogram stored in a storage unit of said at least one arithmetic processing unit and a system control unit exchanging information with said at least one arithmetic processing unit, wherein said at least one arithmetic processing unit comprises:
    (a) communication information holding means, coupled to said storage unit and responsive to a demand by said microprogram, for holding information to be communicated to said system control unit;
    (b) updating suppressing means, coupled to said communication information holding means and responsive to storing of communication information in said communication information holding means, for suppressing updating of internal state information stored in said arithmetic processing unit;
    (c) communication demand means, coupled to said communication information holding means and to said system control unit and responsive to storing of said communication information in said communication information holding means, for outputting a communication demand to said system control unit;
    (d) communication cancelling means, coupled to said system control unit and to said communication information holding means and responsive to an instruction from said system control unit, after processing by said system control unit in response to said communication demand from said communication demand means, for clearing communication information held in said communication information holding means, for cancelling said communication demand from said communication demand means, and for removing updating suppression by said updating suppressing means, thereby bringing operation of said microprogram into a state of waiting for reactuating; and
    (e) microprogram actuating means, coupled to said system control unit, for reactuating operation of said microprogram, in said state of waiting for reactuating, in accordance with an instruction from said system control unit; whereby said microprogram operates to freeze the internal state of said at least one arithmetic processing unit whereupon said system control unit is notified of a demand for communication by said microprogram and, after processing by said system control unit, said microprogram is reactuated.

2. An information processing system as set forth in claim 1 above, further comprising:
    a reporting means, connected between said at least one arithmetic processing unit and said system control unit, for transferring information between said at least one arithmetic processing unit and said system control unit, said reporting means being independent of said communication demand means.

3. An information processing system as set forth in claim 2 above, wherein said reporting means is operative for reporting faults which occur in said at least one arithmetic processing unit.

4. An information processing system as set forth in claim 2 above, further comprising:
    a calendar clock updating unit located in said at least one arithmetic processing unit, and wherein said reporting means is operative for synchronizing said calendar clock updating unit with a second calendar clock updating unit.

5. An information processing system as set forth in claim 1 above wherein said communication demand means consists of a single line.

* * * * *